(12) United States Patent
MacGregor et al.

(10) Patent No.: US 8,439,684 B2
(45) Date of Patent: *May 14, 2013

(54) METHOD OF TEACHING READING

(75) Inventors: Douglas MacGregor, Ottawa (CA); Kari Simpson-Anderson, Ottawa (CA)

(73) Assignee: School Specialty, Inc., Appleton, WI (US)

( * ) Notice: Subject to any disclaimer, the term of this patent is extended or adjusted under 35 U.S.C. 154(b) by 1029 days.

This patent is subject to a terminal disclaimer.

(21) Appl. No.: 11/511,473

(22) Filed: Aug. 29, 2006

(65) Prior Publication Data

US 2007/0048699 A1 Mar. 1, 2007

Related U.S. Application Data

(60) Provisional application No. 60/712,401, filed on Aug. 31, 2005.

(51) Int. Cl.
*G09B 17/00* (2006.01)

(52) U.S. Cl.
USPC ............ 434/178; 434/156; 434/167; 434/169

(58) Field of Classification Search .................. 434/178, 434/167, 169, 118, 156, 159, 179, 185
See application file for complete search history.

(56) References Cited

U.S. PATENT DOCUMENTS

| | | | | |
|---|---|---|---|---|
| 5,147,205 A | * | 9/1992 | Gross et al. ................... | 434/169 |
| 5,957,699 A | * | 9/1999 | Peterson et al. .............. | 434/350 |
| 6,123,548 A | * | 9/2000 | Tallal et al. ................... | 434/185 |
| 6,726,486 B2 | * | 4/2004 | Budra et al. ................... | 434/169 |
| 6,729,882 B2 | * | 5/2004 | Noble ........................... | 434/167 |
| 7,062,220 B2 | * | 6/2006 | Haynes et al. ................ | 434/353 |
| 2003/0039948 A1 | * | 2/2003 | Donahue ........................ | 434/322 |
| 2003/0054328 A1 | * | 3/2003 | Stuppy et al. ................. | 434/350 |
| 2003/0093275 A1 | * | 5/2003 | Polanyi et al. ................ | 704/251 |
| 2003/0232316 A1 | * | 12/2003 | Bookout ....................... | 434/350 |
| 2004/0009462 A1 | * | 1/2004 | McElwrath ................... | 434/350 |
| 2004/0063085 A1 | * | 4/2004 | Ivanir et al. ................... | 434/322 |
| 2004/0072130 A1 | * | 4/2004 | Safran, Sr. .................... | 434/169 |
| 2004/0115596 A1 | * | 6/2004 | Snyder et al. ................. | 434/118 |
| 2004/0180311 A1 | * | 9/2004 | Budra et al. .................. | 434/169 |
| 2004/0210461 A1 | * | 10/2004 | Bohle .............................. | 705/5 |
| 2005/0064375 A1 | * | 3/2005 | Blank ........................... | 434/178 |
| 2005/0069849 A1 | * | 3/2005 | McKinney et al. ........... | 434/178 |
| 2005/0106540 A1 | * | 5/2005 | Wasowicz et al. ........... | 434/178 |
| 2005/0196731 A1 | * | 9/2005 | Budra et al. .................. | 434/169 |
| 2005/0277099 A1 | * | 12/2005 | Van Schaack et al. ........ | 434/322 |
| 2006/0063139 A1 | * | 3/2006 | Carver et al. ................. | 434/178 |
| 2006/0105313 A1 | * | 5/2006 | Mansfield et al. ............ | 434/350 |
| 2006/0111902 A1 | * | 5/2006 | Julia et al. ..................... | 704/236 |
| 2006/0141441 A1 | * | 6/2006 | Hutchinson et al. .......... | 434/350 |
| 2006/0147890 A1 | * | 7/2006 | Bradford et al. .............. | 434/362 |
| 2006/0188860 A1 | * | 8/2006 | Morrison ...................... | 434/322 |
| 2007/0011005 A1 | * | 1/2007 | Morrison et al. ............. | 704/231 |
| 2011/0076653 A1 | * | 3/2011 | Culligan et al. .............. | 434/157 |

* cited by examiner

*Primary Examiner* — Xuan Thai
*Assistant Examiner* — Bruk Gebremichael
(74) *Attorney, Agent, or Firm* — Roxana Wizorek; Godfrey & Kahn, S.C.

(57) ABSTRACT

A computer-based method of providing reading training to a student is provided. The method, based on a training model having individualized program streams, incorporates automatic system intervention to enhance program mastery and decrease reliance on teacher resources. This automatic intervention may accelerate a training stream for students demonstrating early mastery or it may add a review step and/or program modifications for students who are struggling with assigned tasks. Although teachers are advised of a student's progress through the multi-stage program, hands-on intervention is only required for students experiencing extreme difficulties.

18 Claims, 12 Drawing Sheets

Sound Match & Letter-Sound Match

| Practice | |
|---|---|
| Trial | Trial Result |
| 1 | fail |
| 2 | fail |
| 3 | fail |
| 4 | fail |
| Tutorial | |
| 5 | fail |
| 6 | fail |
| 7 | fail |
| 8 | fail |
| Teacher time | |

| Training | | |
|---|---|---|
| Trial | Trial Result | Int. Event |
| 1 | fail | |
| 2 | fail | |
| 3 | fail | |
| 4 | fail | |
| Tutorial | | 2 |
| Practice | | |
| 5 | fail | |
| 6 | fail | |
| Lower mastery criteria by 10% of current mastery criteria | | 3 |
| 7 | fail | |
| 8 | fail | |
| Teacher time | | 4 |

\* Clearing Teacher time (practice and training) will reset interventions.
\* Intervention 1 is getting 100% on a puzzle, which gives student mastery on entire skill

FIG. 5

Comprehension Training

| Practice | |
|---|---|
| Trial | Trial Result |
| 1 | fail |
| 2 | fail |
| 3 | fail |
| 4 | fail |
| Tutorial | |
| 5 | fail |
| 6 | fail |
| 7 | fail |
| 8 | fail |
| Teacher time | |

| Training | |
|---|---|
| Trial | Trial Result |
| 1 | fail |
| 2 | fail |
| 3 | fail |
| Teacher time | |

\* Clearing Teacher time (practice and training) will reset interventions.

FIG. 6

METHOD OF TEACHING READING

This application claims the benefit of U.S. Provisional Application No. 60/712,401 filed Aug. 31, 2005.

RELATED APPLICATION

This application is related to U.S. application Ser. No. 09/726,550 filed Dec. 1, 2000 and issued Apr. 8, 2003 as U.S. Pat. No. 6,544,039. The contents of U.S. Pat. No. 6,544,039 are incorporated herein by reference.

FIELD OF THE INVENTION

The present invention relates to methods of teaching reading skills employing computer-based techniques, and more particularly to methods representing improvements over the subject matter disclosed in the above referenced US Patent.

BACKGROUND

In recent years, considerable effort has been devoted to the development of methods of teaching reading skills. Unfortunately, most of the conventional methods, including known computer based methods, focus on a single technique for teaching all readers, ignoring the fact that each student has different strengths and weaknesses.

Research by experts in the field has demonstrated the need for a balanced approach to reading instruction. This balanced approach involves providing all of the basic skills necessary to develop effective reading skills, and is normally divided into three different program components: phonemic awareness, reading subskills, and reading comprehension.

Phonemic awareness is the understanding that speech is composed of a series of individual speech sounds called phonemes, and to read successfully words are broken down into sounds, for example the word "cat" is broken down into the separate phonemes: /k/, /a/, and /t/.

Reading subskills incorporate several concepts including automaticity and reading subtypes. A task-based, analytic approach is used to deliver both the assessment and intervention requirements to remediate students with reading disabilities or those wishing to accelerate skill development. This overall approach creates a structural and sequential methodology for effectively addressing poor decoding and component reading skills that ultimately leads to improvements in reading comprehension.

The final phase of the training involves reading comprehension, which challenges the students to use the skills learned in the two previous phases in comprehension exercises.

The implementation of such a balanced reading program comes at a cost. For most teachers, assigning and modifying training for a small group of students is manageable. The proliferation of computers and an increased identification of students with reading difficulties make the small group environment much less commonplace.

Typically, this new atmosphere requires educators to sacrifice program efficiency in order to accommodate more students. In order to maintain the efficacy of a balanced approach to reading instruction in a computer lab with 20 or more workstations, the teacher's role as technical, and pedagogical administrator must be significantly re-aligned. If it is not, teachers run the risk of providing incomplete, unbalanced and inconsistent instruction.

The more basic principles of teaching reading skills have been known for some time. However, the most effective way of implementing these principles into a classroom or computer laboratory setting, so that a large number of students at a variety of different reading levels can reap the full benefit of these principles, is still under study.

In the aforementioned and related US Patent a computer based method of teaching reading skills to students is described. In one aspect, the invention comprises the steps of determining which one of a series of predetermined training streams is appropriate for the student, based on the student's grade level; providing a series of phonemic awareness exercises; providing a series of reading subskill exercises; providing a series of reading comprehension exercises; running on a computer the appropriate training stream, which includes: alternating between at least one phonemic awareness exercise and at least one reading subskill exercise until all of the phonemic awareness exercises are mastered; alternating between at least one reading subskill, exercise and at least one reading comprehension exercise until all of the reading subskill exercises are mastered; and mastering remaining reading comprehension exercises; wherein a pre-determined level of mastery must be achieved on each exercise before proceeding to the next exercise.

It is generally understood that reading ability is the key to a student's success in all aspects of the educational experience. As expectations of a student's achievements increases and the scope of the standard curriculum expands the need for students to be able to read at grade level or better is more important than ever.

For these reasons a reading program, to be effective, should be able to assess accurately and quickly the strengths and weaknesses of each student's reading abilities so that the training components of the program address the individual needs of each student. In this regard, an individualized training program should respond specifically and automatically to each student's needs on an individual basis based on training performance. Once the assessment phase has been completed and the individualized training plan assigned the instructional phase must ensure that each student is fully informed of the training methodology and has an opportunity to train without the added pressure of being judged on results. A further important component of the program is intervention whereby both strengths and weaknesses are recognized automatically and appropriate action taken. System intervention, in this way, means that a student can progress through the training program at a rate that is best suited to his/her needs and without needing a teacher's direct involvement. This action may result in acceleration of the training stream if a student has demonstrated mastery at an early stage or simplifying program criteria in the case where a student has demonstrated difficulty in grasping a concept. In all cases the teacher or instructor is provided feed back, but actual, hands-on intervention is only required in extreme cases.

SUMMARY OF THE INVENTION

The present invention seeks to incorporate some or all of the aforementioned improvements into the teaching methods set out in the related US Patent.

Therefore in accordance with the present invention there is provided a method of teaching reading skills to a student utilizing a computer based training program, the computer having, means to implement the training program, a monitor screen to present visual instructions, means to provide auditory instructions, and interactive means to allow the student to respond to visual and auditory instructions, the method comprising: conducting a comprehension assessment to determine a student's reading ability; creating an individualized training program based on the comprehension assessment; implementing the selected series of training streams on the computer, the series of training streams including: a series of phonemic awareness exercises; a series of reading subskill exercises, said subskill exercises including at least a visual matching of a combination of letters having at least one vowel and at least one consonant; and a series of reading comprehension exercises; and continually monitoring the student's progress whereby intervention in the training program is automatically introduced to improve skill mastery.

In preferred embodiments of the invention the intervention consists of accelerating the program if a student demonstrates an early mastery or by reviewing the program's purpose and nature for the student struggling with a task. If a student continues to struggle the mastery criteria of the program is modified to a level which attempts to satisfy the student's comfort level. If the student continues to struggle the program is interrupted and an alternative activity introduced to prevent student fatigue. Ultimately, the teacher or program administrator may have to become involved.

According to a second aspect of the invention there is provided a computer program in machine readable format for use in teaching reading skills to a student, the program including instructions for implementation by a computer to: conduct a comprehension assessment to determine a student's reading ability; create an individualized training program based on the comprehension assessment; implement a selected series of training streams, the series of training streams including: a series of phonemic awareness exercises; a series of reading subskill exercises, said subskill exercises including at least a visual matching of a combination of letters having at least one vowel and at least one consonant; and a series of reading comprehension exercises; and continually monitor the student's progress whereby intervention in the training program is automatically introduced to improve skill mastery.

According to another aspect of the invention there is provided an intervention engine for implementation on a computer by a computer based training program for assisting a student to learn reading skills, the intervention engine being adapted to monitor the student's progress as the student performs a series of program-based, reading related activities and to introduce modifications to the training program responsive to the student's progress.

BRIEF DESCRIPTION OF THE DRAWINGS

The invention will now be described in greater detail with reference to the attached drawings wherein:

FIG. 5 is an overview of the Intervention summaries for sound match and letter-sound match; and FIG. 6 is an overview of the Intervention summaries for comprehension training.

DETAILED DESCRIPTION OF THE INVENTION

Figure 1:
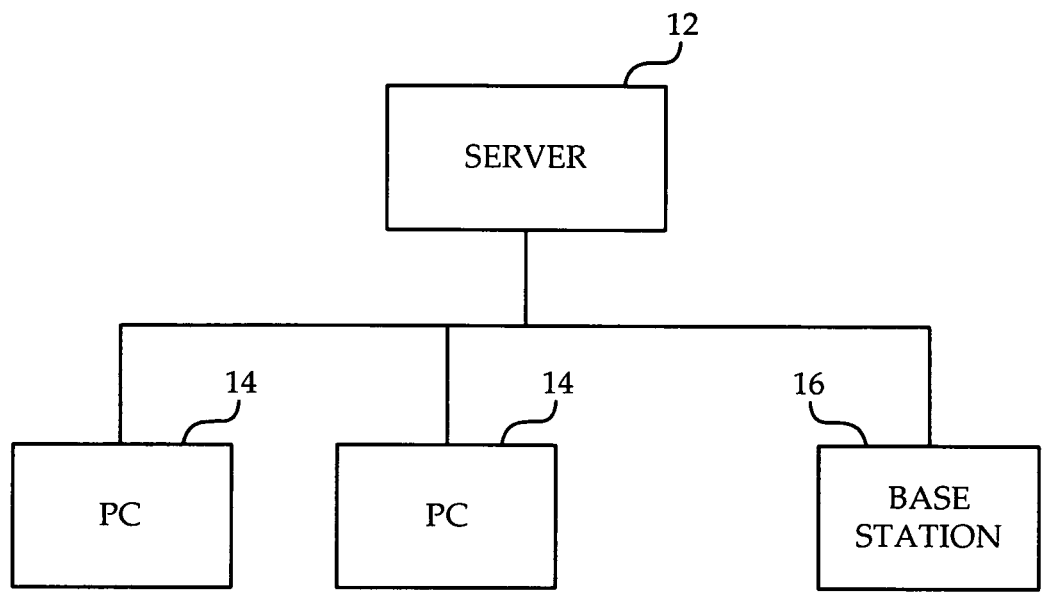
FIG. 1 illustrates a high level diagram of a basic system lay-out.
Figure 2:
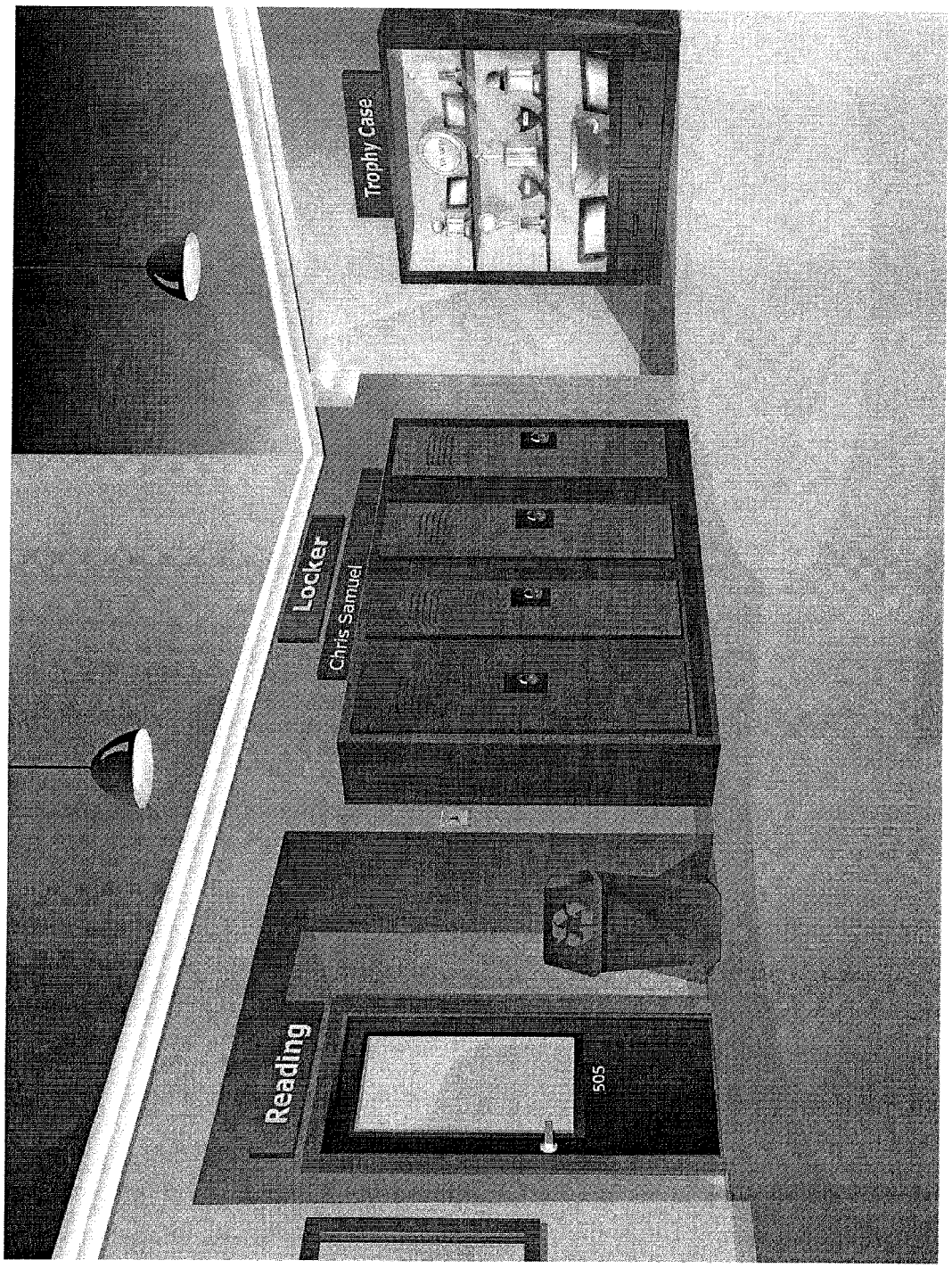
FIG. 2 represents an example of a display screen as presented to a student.
Figure 3A:
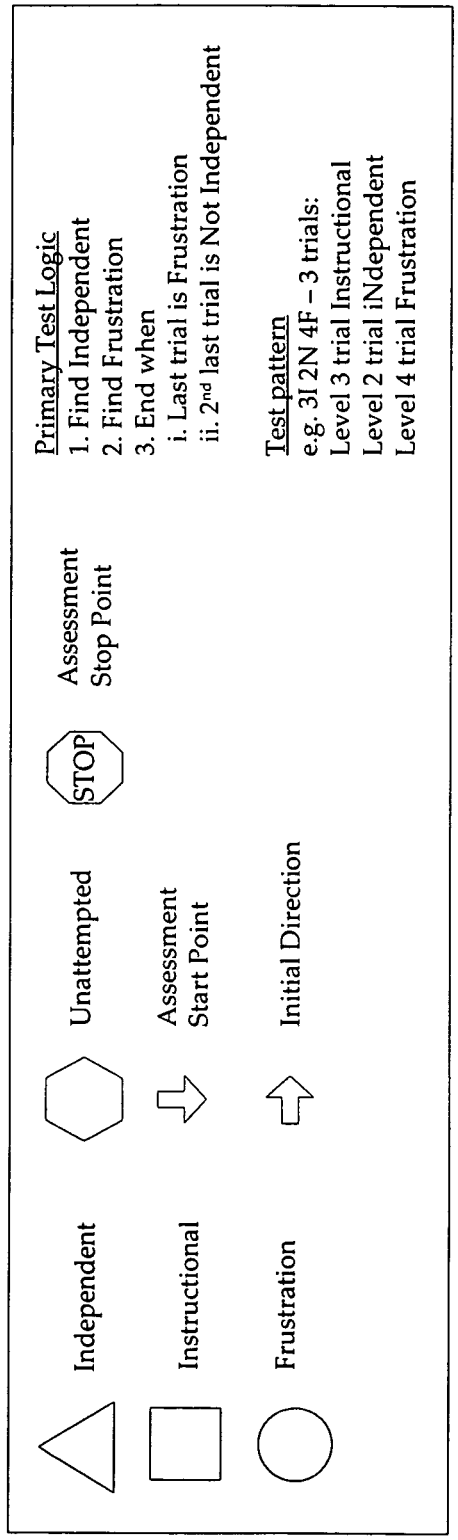
FIG. 3a-3g is a cloze test logic diagram depicting key test cases supported by the invention.
Figure 3B:
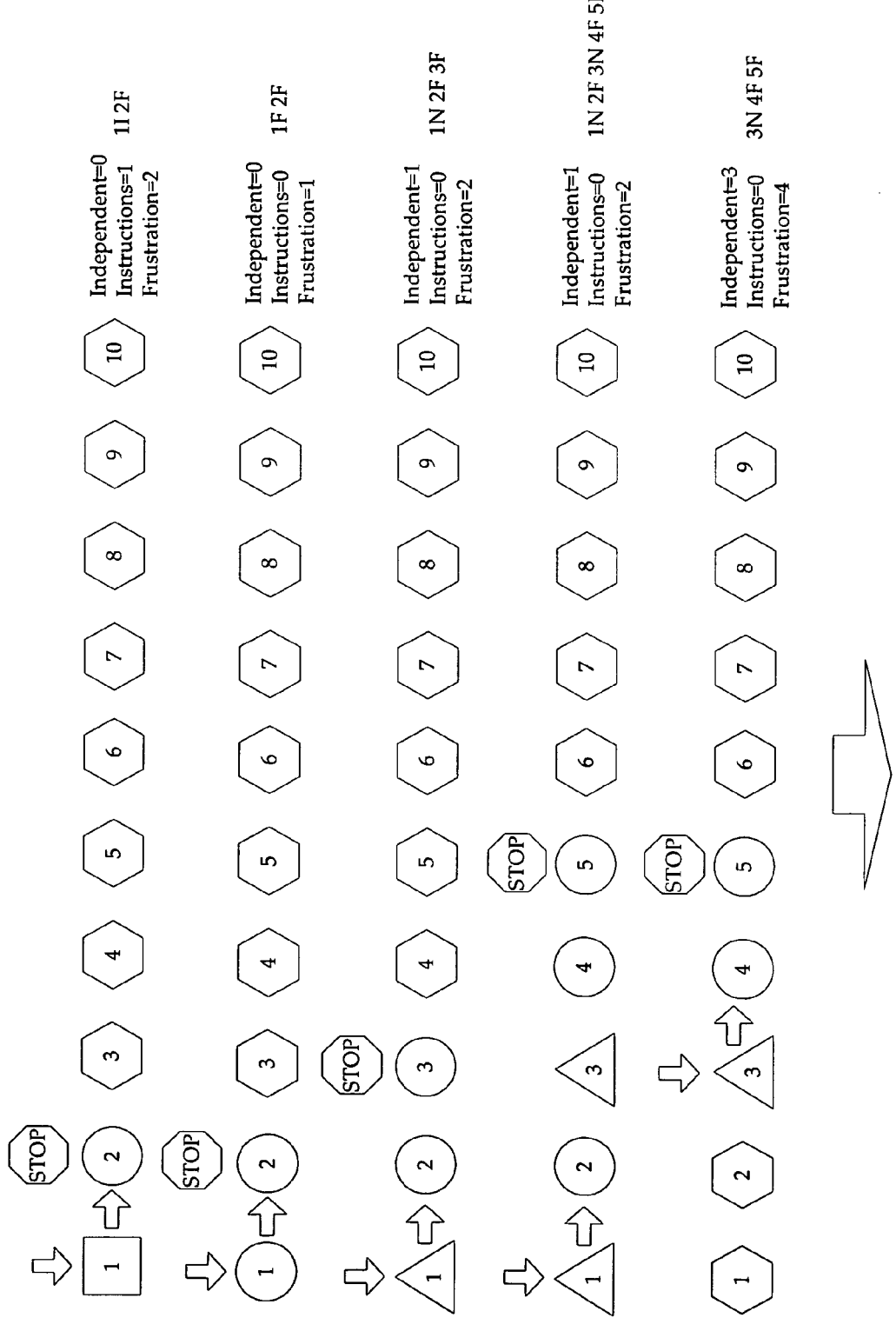
Figure 3C:
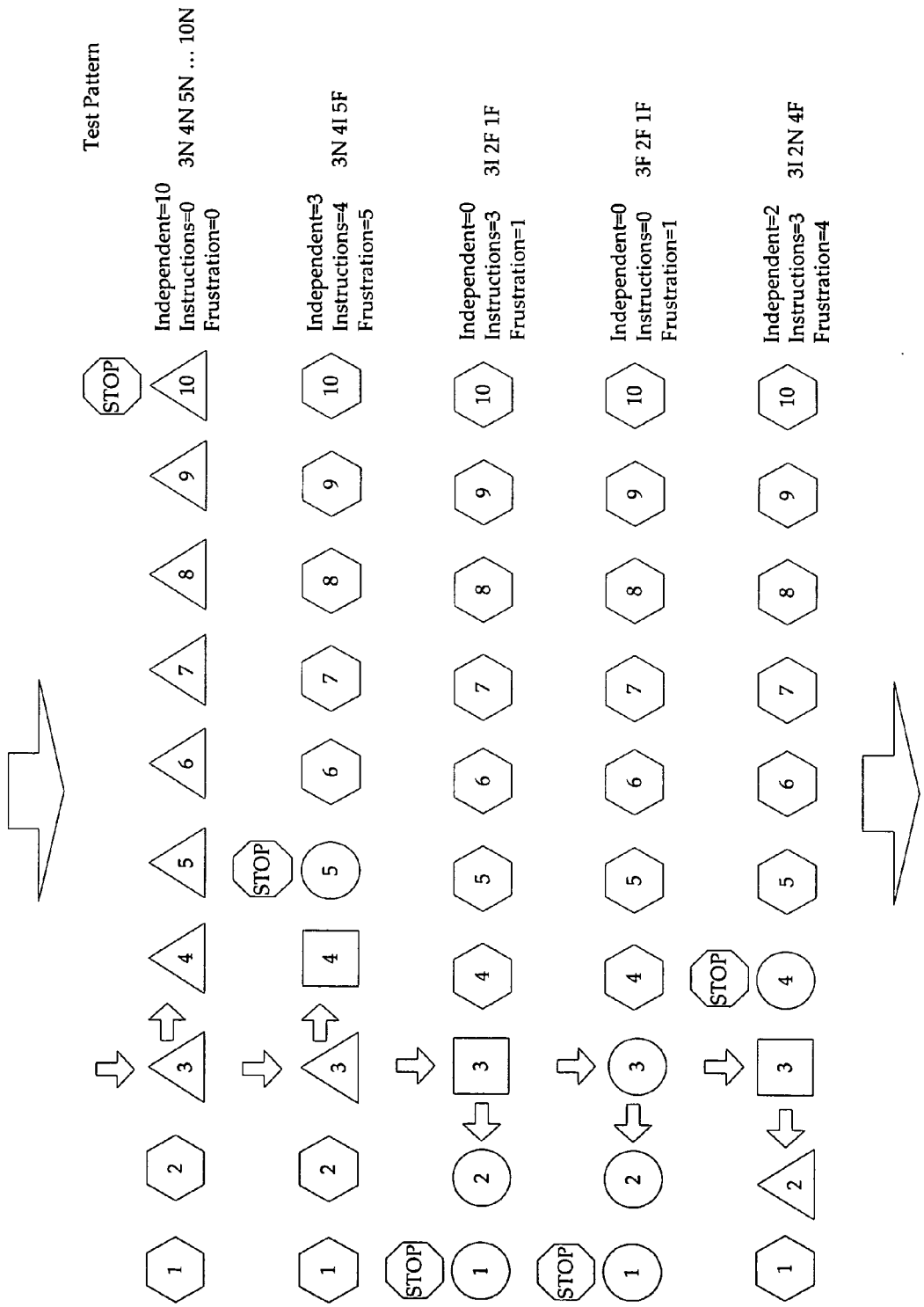
Figure 3D:
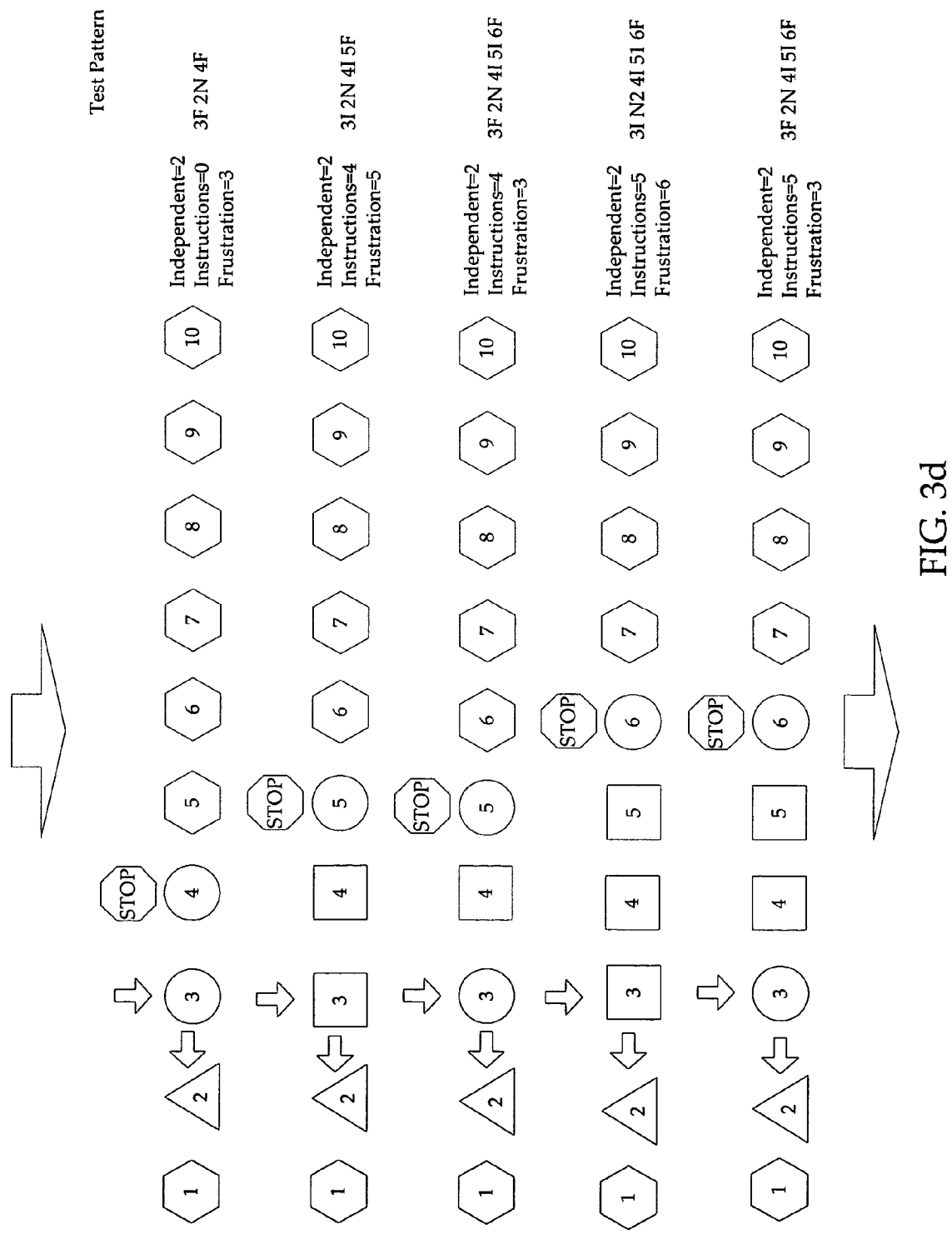
Figure 3E:
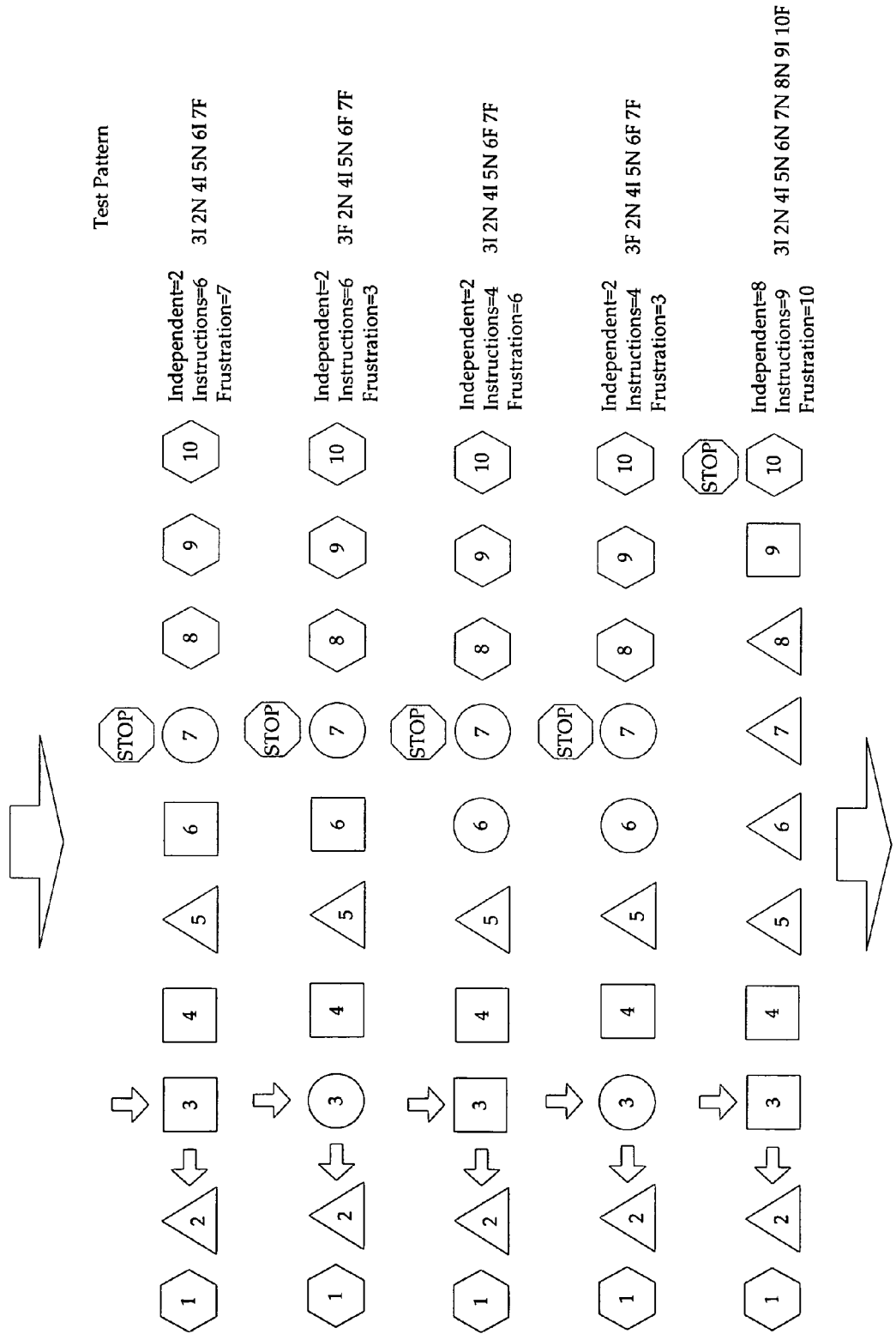
Figure 3F:
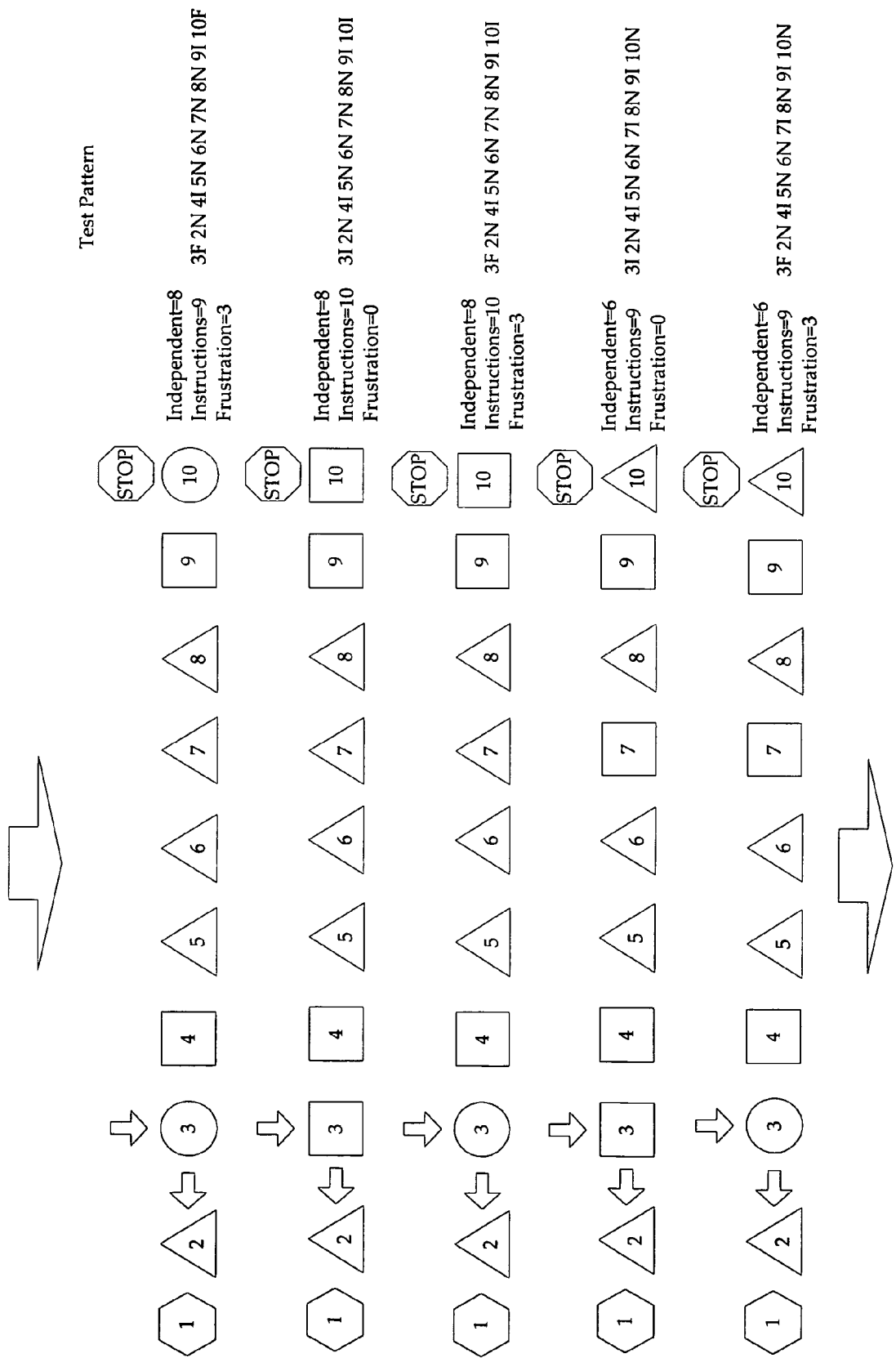
Figure 3G:
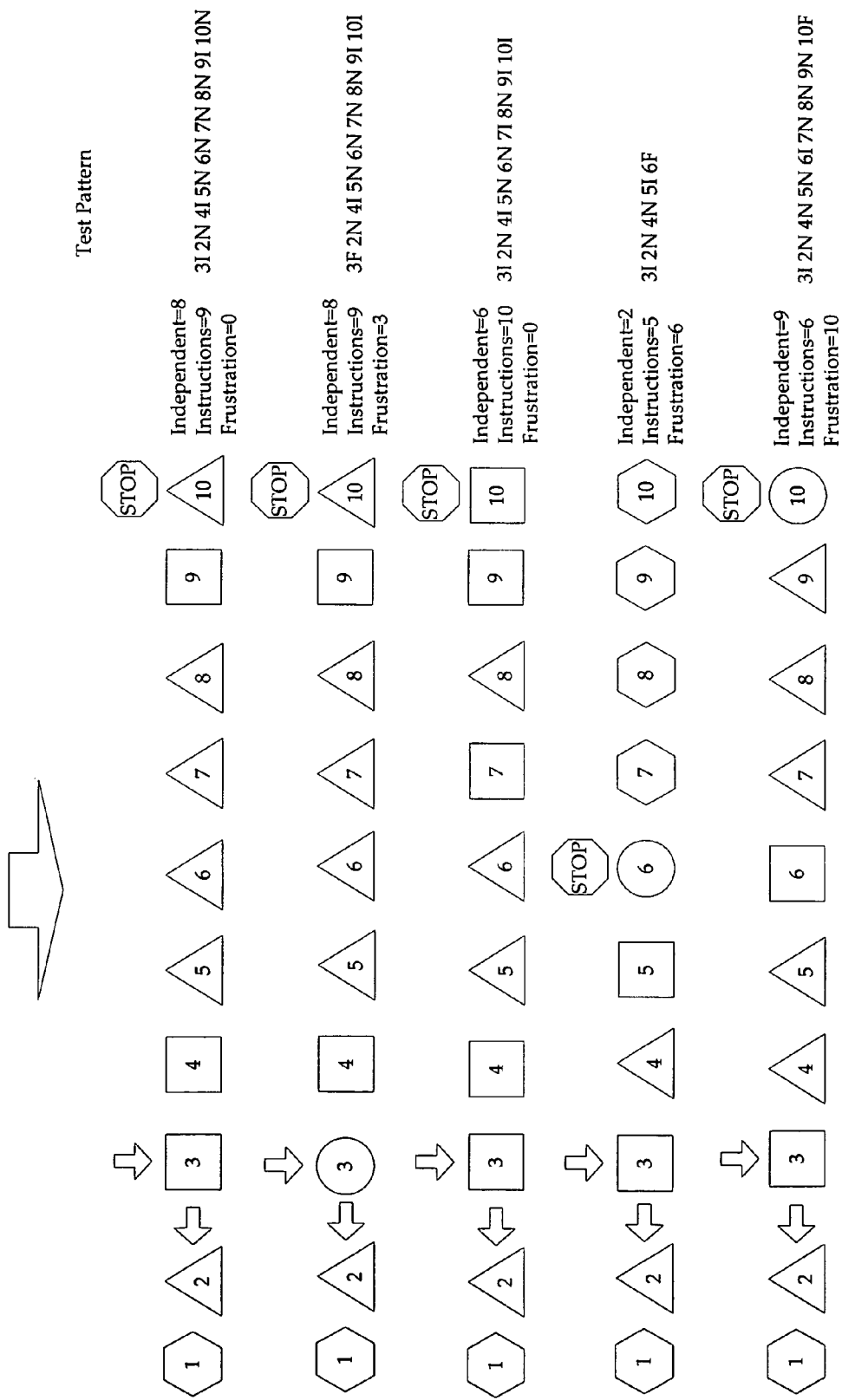

The present invention relates to an approach to reading that is intended to help students that have failed to achieve the skills required to develop comprehension abilities. The reading program of the present invention is embodied in a computer readable format for installation in a stand-alone computer such as a P.C. or in a central server for access by a plurality of computers in a local area network (LAN) or wide area network (WAN) environment. The program, typically, is Browser-based and can be Web deployed. FIG. 1 is a block diagram illustrating generally, a LAN implementation in a school environment. The program is installed in server 12 and individual sites or PCs 14 are linked to the server for use by students in a computer lab or classroom. The teacher or administrator may have a base station 16. It will be apparent to one familiar with information technology that the program distribution can be implemented in many different ways and the system shown in FIG. 1 is intended to show one possible example. The illustration shown in FIG. 2 is intended to represent one example of a physical configuration contemplated by the present invention. It will be apparent to one familiar with this technology that many other configurations can be presented without departing from the basic concepts.

As described previously assessment of a student's reading ability is an important component in the development of an individualized training program. This leads to greater precision in the placement of students into a training program that meets the needs of the student. It also establishes a reliable baseline of reading abilities at the outset so that achievements can be assessed more precisely.

The assessment phase as well as the training phase is based on a three step approach, namely: tutorial; practice and test (train). The tutorial step allows the student to navigate through a multi-stepped, graphically engaging set of instructions that explains both the purpose and the mechanics of the task. This ensures that the student is fully aware of what is to follow and what is expected of him/her. The mandatory practice phase requires the student to demonstrate an understanding of the task. As an example the student may be required to satisfy a "3 out of 4" correct criteria before proceeding to the third phase. This approach has proven to decreases the time to obtain mastery. Finally, the test (train) step conducted after steps 1 and 2 has proven to be more effective once the student has a clear understanding of the purpose and nature of the task.

In the following specific example of the assessment of comprehension phase the student's response to cloze-based items embedded in text passages is marked. In this example the student is presented with a multimedia tutorial describing the design of and response method for the assessment. Then the student is presented with a short paragraph with two cloze items. The student must respond to each item by selecting a word from a drop-down list of three options, correctly or incorrectly. At the end of all practice questions, answers may be reviewed and changed by the student. Once the practice questions have been answered, the student will be presented with a cloze paragraph at a level based on the student's grade, with the exception of students in Kindergarten or Grade One who are exempted from the test. Students in grades 2, 3, 4, and 5 are presented with a cloze paragraph at Level One. Students in grades 6 and higher are presented with a cloze paragraph at Level Three. There are a total of 10 leveled cloze paragraphs each with a minimum of 10 cloze-based items and a maximum of 25 cloze-based items. Once the student has completed all items in a paragraph, the student is given an opportunity to check his/her answers, or submit the answers. The answers are scored by the system. If the student scores at an Independent Level (80% or higher correct answers) the student is presented with a more difficult cloze paragraph. If the student scores at an Instructional Level (between 60% and 79% correct answers) the student is presented with a more difficult doze paragraph. If the student scores at a Frustration Level (less than 59% correct answers) the student is presented with a less difficult doze paragraph. The system will present doze paragraphs at easier or more difficult levels until an independent level and a frustration level has been identified except in cases where the independent level is the highest available level and therefore a frustration level is unidentified and in cases where the frustration level is the lowest available level and therefore an independent level is unidentifiable.

The following is an example use case:

pre-conditions:
   Student is registered in the program as a student in Grade Two or higher.
   Student has entered into the training environment 1. System launches the assessment tutorial
2. Student views the tutorial
3. System provides student with option to reply tutorial or continue on to Practice task.
4. Student opts to continue on to Practice task.
5. System presents short paragraph with two cloze-based items.
6. Student places cursor over "blank" in paragraph.
7. System presents a drop-down menu of options—words to "fill-in-the-blank".
8. Student places cursor on word of choice and right-clicks mouse to indicate selection.
9. System "fills-in-the-blank" with selected word.
10. Student and system repeat steps 6 to 9 until all practice items are complete.
11. System presents "I'm done" button.
12. Student selects "I'm done" button.
13. System presents opportunity for student to check his/her answers or continue to the assessment
14. Student opts to continue to assessment
15. System presents the first cloze-paragraph. For students in grades 2 to 5, the Level One paragraph is presented. For students in grades 6 and above, the Level Three paragraph is presented.
16. Student places cursor over "blank" in paragraph.
17. System presents a drop-down menu of word options to "fill-in-the-blank"—a minimum of three options and a maximum of four options are presented.
18. Student places cursor on word of choice and right-clicks mouse to indicate selection.
19. System "fills-in-the-blank" with the selected word.
20. Student and system repeat steps 16 through 19 until all items are complete.
21. System presents "I'm done" button.
22. Student selects "I'm done" button.
23. System presents opportunity for student to check his/her answers or continue.
24. Student opts to continue.
25. System marks answers—if the student scores Independent or Instructional, the next higher paragraph is presented. If the student scores frustration, the next lower paragraph is presented if one is available or the test is completed.
26. Student and system interact until an Independent level and a Frustration level is identified.
27. Once an Independent level and a Frustration level is identified, the test is complete and the system presents a "congratulations, you are ready to start training" message.

It should be noted that the student must answer each item in each paragraph presented, correctly or incorrectly before the paragraph is considered complete. The assessment is complete when an Independent level has been identified except in cases when the lowest available level is identified as a Frustration level, and when a Frustration level has been identified except in cases when the highest available level is identified as an Independent level. They system, typically, does not provide time limits or time warnings with respect to completing the test. The system does support "pause and resume" functionality in cases when the student is unable to complete the test in a single session. The student is able to suspend the assessment and return to the test another time with previously answered items saved in the database. The diagram shown in FIGS. 3a-3g depicts key test cases which are supported by the system and illustrates how the doze logic works.

While the above use case presents the steps associated with one test scenario it will be apparent to one skilled in the art numerous variations in process steps can and will occur in a real life situation. The assessment program has been designed to provide appropriate responses and/or action to ensure that the test is meaningful and fair to the student.

Once the comprehension assessment has been completed the system prepares and assigns to each student an individualized training program (ITP).

The following use case describes the events that occur as the system assigns an individualized training program to a student based on the student's results on the Comprehension Assessment. The system will assign one of the pre-defined individualized training programs (ITP) to the student. Each ITP consists of a sequence of training exercises from at least one skill area Phonemic Awareness, Sound-Symbol Association, Visual Match, Auditory-Visual Match, and Comprehension.

The ITPs have been designed to be appropriate for students within a grade band (K-1; 2-3; 4-5, 6-7, and 8 to Adult) who require different levels of intervention. Each grade band has at least one ITP classified as Developmental, Comprehensive, Moderate or Accelerated.

An ITP, classified as Developmental, suggests that the student is not reading delayed but rather a pre-reader or an emergent reader that is in the process of developing new reading skills and therefore will benefit from the exposure to the skill areas trained in program yet is not held to strict mastery standards.

An ITP classified as Comprehensive suggests that the student is experiencing significant delays in his reading development and therefore requires training across all skill areas offered in the program.

An ITP classified as Moderate suggests that the student is experiencing a somewhat moderate delay in reading development and therefore does not need to fully train in the introductory reading skills of phonemic awareness, but will benefit from training in the other skill areas offered in the program.

An ITP classified as Accelerated suggests that the student is experiencing minor delays in reading development and therefore will benefit most from the more advanced skill areas such as AVM and Comprehension. Such student demonstrates an understanding of phonemes and sound-symbol correspondences and therefore do not require training time in these skill areas.

When the Individualized Training Program (ITP) has been identified it is assigned to the student.

The following pre-conditions apply:
   Student has been registered in the program (grade level must be entered during registration).
   Student has logged into the program for the first time after registration.

Student has entered the 'classroom' environment
Student has completed a Comprehension Assessment (including the tutorial, practice and actual test) System indicates to student that the test is complete and presents student with the option to continue on to first training assignment or to return to the lobby.
Student selects the "go to training" option.
   1. System assigns appropriate Training Program based on student's test results and grade level.
   2. System presents first skill in the assigned ITP (tutorial, practice & training).
   3. Student masters first skill in ITP.
   4. System presents congratulatory message, intermediate results screen, and a "continue training" button.
   5. Student selects "continue training" button.
   6. System presents next skill in the assigned ITP
Assigning K-1 Developmental Stream
Pre-condition:
   Student is assigned K-1 Developmental Stream.
1. System presents skill area and skill type in the following sequence (with the noted mastery criteria)

|    | Skill Area | Skill Type | Mastery Criteria | Puzzle Size/items per trial |
|----|---|---|---|---|
| 1. | PA | Word Matching - Rhyming | 85% acc. | 3 × 4 |
| 2. | PA | Word Matching - Beginning | 85% acc. | 3 × 4 |
| 3. | PA | Word Matching - Ending | 85% acc. | 3 × 4 |
| 4. | VM | Letters | 90% acc. 200 ms RTR | 50 |
| 5. | PA | Sound Matching - Beginning | 85% acc. | 3 × 4 |
| 6. | VM | CV/VC non-words | 90% acc. 200 ms RTR | 50 |
| 7. | PA | Sound Matching - Ending | 85% acc. | 3 × 4 |
| 8. | VM | CVC non-words | 90% acc. 200 ms RTR | 50 |
| 9. | PA | Sound Matching - Middle | 85% acc. | 3 × 4 |
| 10. | VM | CVC words | 90% acc. 200 ms RTR | 50 |
| 11. | PA | Blending - 3 phonemes | 85% acc. | 3 × 4 |
| 12. | VM | CVCV non-words | 90% acc. 200 ms RTR | 50 |
| 13. | PA | Blending - 4 phonemes | 85% acc. | 3 × 4 |
| 14. | VM | CVCV words | 90% acc. 200 ms RTR | 50 |
| 15. | SSA | Letter-Sound Match - Letters, group 1 | 85% acc. | 3 × 4 |
| 16. | SSA | Letter-Sound Match - Letters, group 2 | 85% acc. | 3 × 4 |
| 17. | VM | Words at Level One | 90% acc. 200 ms RTR | 50 |
| 18. | SSA | Letter-Sound Match - Beginning | 85% acc. | 3 × 4 |
| 19. | VM | Words at Level Two | 90% acc. 200 ms RTR | 50 |
| 20. | SSA | Letter-Sound Match - Ending | 85% acc. | 3 × 4 |
| 21. | AVM | Letter Names | 90% acc. 160 ms RTR | 50 |
| 22. | SSA | Letter-Sound Match - Middle | 85% acc. | 3 × 4 |
| 23. | AVM | Letter Sounds | 90% acc. 160 ms RTR | 50 |
| 24. | SSA | Letter-Sound Match - CV/VC group 1 | 85% acc. | 3 × 4 |
| 25. | SSA | Letter-Sound Match - CV/VC group 2 | 85% acc. | 3 × 4 |
| 26. | SSA | Letter-Sound Match - CV/VC group 3 | 85% acc. | 3 × 4 |
| 27. | AVM | CV/VC non-words | 90% acc. 160 ms RTR | 50 |
| 28. | SSA | Blending - 3 phonemes | 85% acc. | 3 × 4 |
| 29. | AVM | CVC non-words | 90% acc. 160 ms RTR | 50 |
| 30. | SSA | Blending - 4 phonemes | 85% acc. | 3 × 4 |
| 31. | AVM | CVC words | 90% acc. 160 ms RTR | 50 |
| 32. | SSA | Segmentation - 3 phonemes | 85% acc. | 3 × 4 |
| 33. | AVM | CVCV non-words | 90% acc. 160 ms RTR | 50 |
| 34. | AVM | Words at Level One | 90% acc. 160 ms RTR | 50 |
| 35. | AVM | Words at Level Two | 90% acc. 160 ms RTR | 50 |
| 36. | Comp | Paragraphs at Level One | 80% acc. | * |

The above use case is intended to illustrate an example ITP for one grade level situation. It will be apparent to those skilled in the art that variations on this program will be presented to other grade levels and to students placed in other developmental levels within each grade level.

In this reading program, as will be discussed later, a puzzle approach to presenting training concepts may be used. In the puzzle approach a mosaic image is provided in a puzzle format. For example, a 3 tile by 3 tile display is available to the student in which each of the 9 tiles represents the answer to a question. When each question has been successfully answered the completed mosaic image is displayed. This puzzle approach is used to encourage and reward students participating in the training program.

An important aspect of the invention is an automatic Intervention Engine (IE) that monitors the student's progress and intervenes when necessary. This ensures that students use their training time effectively and efficiently by achieving greater skill mastery in less time on task. The five keys elements of the IE are: accelerate; review; modify; recess; and teacher notification. Under the accelerate element, particularly as it relates to Phonemic Awareness (PA) and Sound-Symbol Awareness (SSA) training, when students demonstrate mastery by achieving very high accuracy on a set of tasks, mastery of the skill is awarded and the student automatically moves on to the next skill in the sequence. In this way the student spends more time on skill development they need and less on skills they don't need. The review component extends to all skill areas. When a student is struggling with a task, the tutorial and practice sessions are automatically reviewed to remind the student of the purpose and nature of the task. If a student continues to struggle, minor modifications of a simplifying nature are made to the mastery criteria to prevent frustration and to maintain the student's sense of accomplishment. Typically, any modified skill is automatically re-presented to the student at the end of the training stream if the student has not demonstrated sufficient reading gains. When a student continues to struggle, fatigue may prevent the student from achieving mastery in the skill. In this situation, training on the skill is interrupted (recess) and an alternate, more enjoyable, activity is presented. Subsequently, the student is returned to the previously interrupted skill. Under the teacher notification aspect the automatic Intervention Engine the teacher is made aware of the nature of the intervention giving them an opportunity to intervene if they are able. When a student demonstrates an inability to master a skill despite the automatically triggered interventions, the training is put on hold and the teacher must then become involved in order to re-engage student training.

This use case will describe the events that occur as a student completes an instance of Phonemic Awareness Training or Sound Symbol Association Training. The student will progress through a sequence of tutorial, practice, training and intermediate results.

There are a total of ten lessons (tutorial, practice, training) for Phonemic Awareness training. The lessons are as follows:

There are 3 Word matching lessons (rhyming, beginning, ending)

There are 3 Sound matching lessons (beginning, ending, middle)

There are 2 blending lessons (3 & 4 phonemes)

There are 2 Word Building lessons (3 & 4 phonemes)

There are a total of fourteen lessons (tutorial, practice, training) for Sound Symbol Association Training. The lessons are as follows:

Letter-Sound Match—Letter, group 1; Letter-Sound Match—Letters, group 2; Letter-Sound Match—Beginning; Letter-Sound Match—Ending; Letter-Sound Match—Middle; Letter-Sound Match—CV/VC group 1; Letter-Sound Match—CV/VC group 2; Letter-Sound Match—CV/VC group 3; Blending—3 phonemes; Blending—4 phonemes; 3 Sound Word Building; 4 Sound Word Building; 3 Letter Word Building; 4 Letter Word Building.

The Sound-symbol training as described herein is designed to get students familiar with letter-sound correspondence prior to the intense, rapid, and consistent training of subskills activities. As a warm-up activity, students will be better equipped to progress through AVM training.

Additionally, CV/VC non-word combinations address the consistently difficult AVM CV/VC non-word skills. Students have an opportunity to become familiar with these combinations in a "puzzle-style" activity prior to facing the skills in AVM training. This practice opportunity significantly decreases the frustration students typically experience when attempting this two-letter combination in AVM training. This activity also functions as an intervention as a student will automatically revisit this activity should they experience difficulty mastering the AVM CV/VC skill.

Use Case Progresses through Phonemic Awareness or Sound Symbol Association Training (Word Matching, Sound Matching and Blending {WM/SM/B})

Pre-conditions:

The student has a PA/SSA lesson assigned to them.

The student has entered the training environment from the lobby

1. The System presents the tutorial splash-screen that includes the name of the tutorial and a 'go' button to start the tutorial.
2. The student selects 'go'
3. The system presents the tutorial
4. The student views the tutorial
5. The system will present the last page of the tutorial with a 'Try it!' button or a 'replay tutorial' button.
6. The student selects the 'Try it!' button to begin the practice
7. The system presents the practice task
8. The student completes the practice task.
9. The system will present the last screen of the practice which contains a button that says 'Start Training'
10. The student selects the button to begin training
11. The system launches the training Puzzle Gallery interface and allows the student to select the first tile to begin training. The first tile is lit and flashing. It changes color when selected by the student.
12. The system then presents a puzzle
13. The student selects one of the puzzle pieces.
14. In PA training the system presents the student with a question—the Question sounds are played. In SSA training the system presents target text and highlights the target text. The option sounds are played.
15. After all the sounds have been played once, the system presents the answer buttons
16. The student enters the correct answer and the answer button turns a different color to indicate that it is correct.
17. The system then presents the puzzle with one puzzle piece turned over
18. The student then selects another piece to launch another question.
19. Steps 15 & 16 occur 20 times.
20. The student masters one 'puzzle'. The puzzle is shown as completed.
21. The system displays a continue button on the completed puzzle
22. The student selects the continue button
23. The system presents the intermediate results (IR) screen, and presents a button that will allow the student to return to the puzzle gallery.
24. The system puts up a motivational movie in front of the intermediate results screen (ie: it's good for 2!) and the movie closes itself
25. The student views the intermediate results screen, reviews any errors made in previous training trials, and selects the button to return to the puzzle gallery
26. Steps 13-21 are repeated 2 more times (total of 3 for mastery).

Intervention Engine Actions in Phonemic Awareness or Sound-Symbol Association training activities.

WM/SM/B Intervention Event 1-100% Correct on any Puzzle

Precondition: Student answers all PA/SSA/ questions correct on any puzzle

1. System considers the student to have mastered the PA/SSA lesson and gives them mastery on all three puzzles
2. The system gives a congratulations message.
3. The system returns the student to the puzzle gallery showing the student their 3 thumbnail images, allows them to select next exercise or exit.
4. The system writes the mastery record to the database and notes that the student got 100% on any puzzle.

WM/SM/B Intervention Event 2—ANY Puzzle

Precondition: The Student has been Unsuccessful at Mastering a Puzzle after Four Attempts 1. The system pauses training and presents the PA/SSA tutorial for the skill the student is working on.
2. The student watches the tutorial
3. The system then presents the practice session for the skill the student is working on
4. The student interacts with the system in the Practice session. When he has met the practice criteria he is placed back into the puzzle gallery Post-condition: The student selects the next lit puzzle and begins training on the puzzle WM/SM/B Intervention Event 3—ANY Puzzle Precondition: The student has been Unsuccessful at Mastering a Puzzle after 6 Attempts (Note that Intervention Event 1 Would have Occurred After 4 Unsuccessful Mastery Attempts)
1. The system makes a modification (a reduction in accuracy requirement in the range of 10 to 25%) to the mastery criteria for the skill for the skill the student is working on.
2. System sends notification of the intervention event to the teacher homepage.
3. System resumes presentation of the training task.

Post-condition: The student selects the next lit puzzle and begins training on the puzzle WM/SM/B Intervention Event 4—Any Puzzle—Teacher Time Precondition:
The student has been unsuccessful at mastering a puzzle after 8 attempts (note that Intervention Event 3 would have occurred after 6 unsuccessful mastery attempts)
1. The system stops the training and sends notification to the teacher homepage
1. The system presents a dialog box advising the student to get their teacher.

Note:
The teacher can clear teacher time in her teacher Admin interface.
Once teacher time has been cleared the student should be presented with the puzzle gallery with the first tile lit.
When teacher time is cleared the student will be placed back into training and will need to proceed through intervention events 1 and 2 before intervention event 3 will be triggered again.
Note that this is two consecutive puzzles that aren't mastered. The student can master puzzles in between intervention events. For example, the student masters, fails, fails—intervention event 1, masters, fails, fails—intervention event 2 etc This use case will describe the events that occur as a student begins an instance of Auditory—Visual Match or Visual Match Training. Both instances of training function in the same way unless specifically noted. The student will progress through a sequence of tutorial, practice and training and intermediate results.

There are a total of 25 lessons (tutorial, practice, and training) for Auditory-Visual Match training. The lessons are as follows:
Letter names, letter sounds, CV/VC non-words, CVC non-words, CVC words, CVCV non-words, CVCV words, CCVC non-words, CCVC words, CVCC non-words, CVCC words, CVVC non-words (group 1), CVVC words (group 1), CVVC non-words (group 2), CVVC words (group 2), Words 1, Words 2, Words 3, Words 4, Words 5, Words 6, Words 7, Words 8, Words 9, Words 10.

There are a total of 24 lessons (tutorial, practice, and training) for Visual Match training. The lessons are as follows:
Letters, CV/VC non-words, CVC non-words, CVC words, CVCV non-words, CVCV words, CCVC non-words, CCVC words, CVCC non-words, CVCC words, CVVC non-words (group 1), CVVC words (group 1), CVVC non-words (group 2), CVVC words (group 2), Words 1, Words 2, Words 3, Words 4, Words 5, Words 6, Words 7, Words 8, Words 9, Words 10.

Use Case
Progression through Auditory-Visual Match & Visual Match Training
Pre-conditions:
The student has AVM or VM training assigned to her.
The student has entered the training environment.
1. System presents tutorial splash screen with "go" button, name of the tutorial and directions to select the go button when ready to start tutorial.
2. Student indicates that she is ready to start training by selecting the "go" button.
3. System presents training tutorial
4. Student watches tutorial
5. System presents the last page of the tutorial with a "try it" button and a "replay tutorial" button.
6. Student selects the "try it" button to start practice
7. System presents practice splash screen with "go" button, name of the practice and directions to select the go button when ready to start practice
8. Student selects the "go" button
9. System presents the practice task.
10. Student completes practice task.
11. System presents intermediate results screen for the practice session and a continue button
12. Student selects "Start training" button.
13. System presents the training interface, which includes the name of the training activity and directions for the student to select the "start training" button.
14. Student selects button to begin training.
15. System presents a 3-second "countdown" animation
16. System presents a total of 50 training tasks
17. Student completes all 50 training tasks.
System records percentage correct score, average response time, time on task, errors—target & response in database, as well as the date that training was started and the date that training was completed
18. System presents intermediate training results with a "continue training" button.
19. Student selects "continue training" button
20. System presents training environment with a "start training" button.
21. Student selects button to start training.
22. System presents "countdown to training" animation
23. System presents another 50 training tasks
24. Student completes the 50 training tasks.
25. System records percentage correct score, avg. response time, time on task, and errors (target & response) in database.
26. System present intermediate training results
27. System and Student repeat steps 17 through 24 until mastery criteria is achieved
28. System presents intermediate results screen.
29. System congratulates student on mastery and writes mastery record to database Data Definitions:
Percentage correct score: used to determine if accuracy criteria is met, each correct response is tallied and a percentage correct score is calculated for the 50 items—e.g.: 48 correct responses out of 50 items equals a percentage correct score of 96%.
Average response time: used to determine if response time criteria is met, each response time—defined as the length of time between task presentation and key selection—is added together and divided by the number of responses to find the average response time for each task. Time out errors and incorrect answers are not included in average response time calculation.

Time on Task is recorded as well as the date that training was started and the date that training was completed Errors are recorded in the form of target and response. If no response is provided for an item, it is recorded as an error with the response noted as "timed out".

Intervention Engine Activities in Reading Subskills (Auditory-Visual Match and Visual Match) training activities:

AVM CV/VC Intervention Event—Level 1

Pre-condition: Student fails to meet mastery criteria within 10 trials.

Note: This is an AVM Training Intervention Only.
1. From the intermediate results screen, System presents "let's try something different" video with "go" button.
2. Student selects "go" button
3. System presents AVM practice session
4. Student completes AVM practice session
5. System records the occurrence of the CV/VC Intervention 1 event in database and sends notification of the event to the teacher homepage.
6. System presents intermediate results screen for practice session with a "continue" button. NOTE: Student can not exit from this screen
7. Student selects "continue" button.
8. System presents classroom environment with "go" button.
9. Student selects "go" button. Optionally, the student exits to the Lobby.
10. System presents countdown to training animation
11. System presents AVM CV/VC training items.

Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

AVM CV/VC Intervention Event—Level 2

Pre-Condition: Student Fails to Meet Mastery Criteria within 5 Trails Following a CV/VC Intervention Event—Level 1.

Note: This is an AVM Training Intervention Only
1. From the intermediate results screen, the System presents "let's try something different" video with "go" button.
2. Student selects go button.
3. System presents Sound-Symbol Association CV/VC Group 3 training. (student will complete full activity—tutorial, practice and training—standard mastery criteria will apply).
4. Student completes SSA CV/VC Group 3 training until mastery.
5. System records the occurrence of the CV/VC Intervention Event—level 2 in database and sends notification of the event to the teacher homepage.
6. System presents intermediate results screen for SSA CV/VC Group 3 activity, then congratulates student and presents student with "continue training" button. Note: Student can not exit from this screen
7. Student selects "continue training" button.
8. System presents classroom environment with go button
9. Student selects go button. Optionally, the student exits to the lobby.
10. System presents countdown to training animation
11. System presents AVM CV/VC training.

Note: The system will present the SSA CV/VC activity even if the student has previously mastered this skill as part of their ISP stream. There is no need to overwrite the mastery record—the presentation of the SSA CV/VC activity in this scenario, while acting like a regular skill to master, should be considered as an intervention event, and therefore independent of the ITP training stream.

Note: The SSA Intervention rules apply to the SSA CV/VC Intervention activity.

Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

AVM CV/VC Intervention Event—Level 3

Pre-Condition: Student Fails to Meet Mastery Criteria within 5 Trails Following a CV/VC Intervention Event—Level 2.

Note: This is an AVM Training Intervention Only
1. From the intermediate results screen, System presents "let's try something different" video with "go" button.
2. Student selects go button.
3. System presents Sound-Symbol Association CV/VC Group 3 training. (student will complete full activity—tutorial, practice and training—standard mastery criteria will apply).
4. Student completes SSA CV/VC Group 3 training until mastery.
5. System records the occurrence of the CV/VC Intervention event—level 3 in database and sends notification of the event to the teacher homepage.
6. System presents intermediate results screen for SSA CV/VC Group 3 activity, then congratulates student and presents student with "continue training" button. Note: Student can not exit from this screen.
7. Student selects "continue training" button.
8. System presents classroom environment with go button
9. Student selects the go button. Optionally, the student exits to the lobby.
10. System presents countdown to training animation.
11. System presents AVM CV/VC training.

Note: The system will present the SSA CV/VC activity even if the student has previously mastered this skill as part of their ITP stream or as part of an intervention event. There is no need to overwrite the mastery record—the presentation of the SSA CV/VC activity in this scenario, while acting like a regular skill to master, should be considered as an intervention event, and therefore independent of the ITP training stream.

Note: The SSA Intervention Rules apply to the SSA CV/VC intervention activity

Note: If the student fails to master AVM CV/VC after the Level 3 intervention within 15 trials, then the standard AVM Intervention Events apply beginning with the Level 3 intervention event Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

Intervention Event—Level 1 (for all AVM and VM Training Activities Except for AVM CV/VC)
Pre-condition: Student Fails to Meet Mastery Criteria within 10 trials.
1. System presents tutorial for the present skill.
2. Student watches tutorial
3. System presents Practice session.
4. Student completes Practice session
5. System records the occurrence of Level 1 intervention event in database and sends notification of the event to the teacher homepage.
6. System presents intermediate results screen for practice session with a continue button. Note: Student can not exit from this screen.
7. Student selects the continue button.
8. System presents classroom environment with go button
9. Student selects the go button. Optionally, the student exits to the lobby
10. System presents countdown to training animation.
11. System presents training (the same type that was intervened)
Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

Intervention Event—Level 2—(for all AVM and VM Training Activities Except for AVM CV/VC)
Pre-Condition: Student Fails to Meet Mastery Criteria within 5 Trials after Level 1 Intervention.
1. System makes a modification (a reduction of the pace requirement in the range of 10 to 25%) to the mastery criteria for the present skill.
2. System records the occurrence of a level 2 intervention event and sends notification to the teacher homepage.
3. Student resumes training.
Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

Intervention Event—Level 3
Pre-Condition: Student Fails to Meet Mastery Criteria within 5 Trials after any Level 2 intervention.
1. System presents "let's try something different" screen with "go" button
2. Student selects "go" button
3. System takes student out of AVM or VM training environment and presents the next skill in the student's ISP training stream that is not an AVM skill if the student was just taken out of an AVM skill or a VM skill if the student was just taken out of a VM skill.
  Note: Once the student has mastered the 'other' skill they will be returned to the AVM or VM skill they were working on and then continue on with the ITP stream as normal—when the student reaches the skill that was mastered as part of this intervention, the system will skip this previously mastered skill and present the next skill in the sequence.
4. System records the occurrence of the Level 4 intervention event and sends an intervention message to the teacher.

Note: Intervention Rules apply to the skill that is present to the student as a result of this intervention event.
Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

Intervention Event—Level 4
Pre-Condition: Student Fails to Meet Mastery Criteria within 5 Trials after Level 4 Intervention.
1. System suspends training
2. System records intervention event
3. System presents "Teacher Time" screen
4. System records the occurrence of a Level 4 intervention event.
5. System sends "Teacher Time" flag to teacher's homepage.
Note: Teacher can clear student's Teacher Time from Teacher Admin interface. Once teacher time has been cleared the student will resume training.
Note: If the student had two consecutive trials that met the mastery criteria immediately prior to the triggering of the intervention event, then it is possible for the student to master the skill on the next trial after resuming training after the intervention event—in other words, the occurrence of an intervention event does not reset the consecutive trials counter.

Comprehension Training
This use case will describe the events that occur as a student begins an instance of Comprehension Training. The first time the student encounters Comprehension Training, the system will present the student with a tutorial, and a practice opportunity prior to the presentation of the training. When the student progresses to the next level of comprehension paragraphs, the system will simply present a short tutorial (introduction to the level) followed by the training activity—No practice will be presented after the student completes the first assigned level There are a total of 10 levels of training. Each level will include a selection of 9 paragraphs and, associated with each paragraph, a selection of multiple-choice questions (no less than 5 and no more than 10). A student must master all 9 paragraphs to achieve mastery of the level/skill. The only intervention event in Comprehension training is Teacher Time. Teachers will be able to adjust mastery criteria for a paragraph only and not for the skill/level. As a result, any comprehension level/skill mastered will be considered mastered when a new stream is assigned to the student as part of a training extension or if post-test results indicate that the student is not reading at grade level—therefore, the student will not, by default, be presented with any previously read paragraphs.

In the comprehension training the student will be presented with scrollable text, and questions that can be flipped through. There may or may not be a "retention" component to the training. If not, the student will read and respond to questions and then "submit" answers for scoring. The comprehension training borrows design elements from phonemic awareness and sound-symbol association training in terms of the use of the Picture Gallery paradigm—each Picture in the gallery will represent a paragraph and the student's goal is to uncover each picture in the gallery by successfully answering the questions that are associated with each paragraph. In other words, completing the gallery, or revealing all 9 pictures in the gallery equals mastery of the level, which equals mastering a skill.

The comprehension training will maintain the existence of a glossary. Any and all words that have a short, one to two sentence "dictionary" entry in the glossary will be presented in "hypertext" blue and will be active and accessible—clicking on the hypertext will result in the system presenting a pop-up window with the word and definition. Each paragraph will have approximately 15 to 20 glossary words. An audio component may also be provided.

It must also be noted that there will be two sets of comprehension content—junior content that will be automatically assigned to students in the junior grades—K-8, and senior content that will be automatically assigned to students in senior grades—9 to Adult—the assignment of content will be based on the student's registered grade level and not reading level as determined by the assessment of comprehension phase. A manual override will be made available for a teacher wishing to assign junior content to older students and vice versa. This manual override will be available to teachers where they modify comprehension training.

Use Case-Progression through the First Instance of Comprehension Training

Pre-conditions:

The student has comprehension training skills assigned as part of the ITP.

The student has entered the classroom environment and this is the first time any comprehension training has been presented as part of the ITP.

1. System presents the comprehension training splash screen (classroom) with "start" button, and name of skill area & skill type (for example Comprehension: Level 1).
2. Student selects the "start" button.
3. System presents tutorial.
4. Student watches tutorial
5. System presents the last page of the tutorial with a "practice" button and a "replay" button.
6. Student selects the "practice" button to begin the activity.
7. System presents the practice task
8. Student completes practice task
9. System presents the last screen of the practice which includes a button that says "start training"
10. Student selects "start training" button.
11. System launches the training Picture Gallery interface—each tile is labeled with the topic of a paragraph—the system allows the student to select any tile to begin training.
12. System then presents the paragraph that is associated with the subject written on the selected tile.
13. Student reads the text and correctly answers all of the questions associated with the paragraph.
14. Once all of the questions have been answered, the "I'm done" button appears.
15. Student selects the "I'm done" button.
16. System presents "do you wish to check your work?" dialogue box with "yes" and "no" buttons.
17. Student selects "no" button. Alternatively, the student selects "yes".
18. System presents the intermediate results screen with a continue button
19. Student views intermediate results screen and selects the continue button.
20. The system then presents the picture gallery with the selected tile updated to indicate that the paragraph has been mastered.
21. Student selects the next available tile in the gallery to launch another
10 paragraph.
22. Steps 13 & 18 occur until all 9 tiles in the gallery have been attempted.
23. The student masters the last of 9 paragraphs. The system presents the IR screen and a motivational video announcing mastery of the comprehension level. The video closes itself. The IR screen includes a continue button.
24. Student selects the continue button.
25. System presents the completed picture gallery with a continue button.
    NOTE: the student is able to click on any picture in the gallery to see the thumbnail enlarge to full screen. The picture is "closed" by selecting the "close" button.
26. Student selects the continue button
27. System present next training activity in the student's assigned training stream.
    NOTE: Mastery criteria are defined by the ITP. In most cases, this will mean either 90% or 100% accuracy on the questions for each paragraph. For mastery of the level/skill, students must successfully complete all 9 paragraphs.

NOTE: Data captured:

The system saves the student time on task, the time spent in the room, the number of questions presented, the number of correct responses and the number of incorrect responses on the first attempt, the number of correct responses and the number of incorrect responses on the second attempt, the type of question presented (i.e.: main idea, sequence, etc.), the answers given for each question, the mastery criteria under which the student achieved mastery, the date that training was started and the date that skill was completed The Types of Questions to be recorded and presented in the IR screen/error list and Comprehension training report may include, for example: Main Idea; Sequence; Detail; Inference; Prediction; Literary Features, Cause & Effect; Author's Purpose; Vocabulary; Relationship.

The system also saves Time Spent in Tutorial, Time Spent in Practice, Time Spent in Training; and Time Spent per Skill.

The only intervention event carried out by the Intervention Engine in Comprehension training is known as "Teacher Time". This intervention event pauses the system and notifies the student's teacher that teacher intervention is required. The system pause is only removed by the teacher from either the Teacher homepage or from the Student Training Interface.

Figure 4:
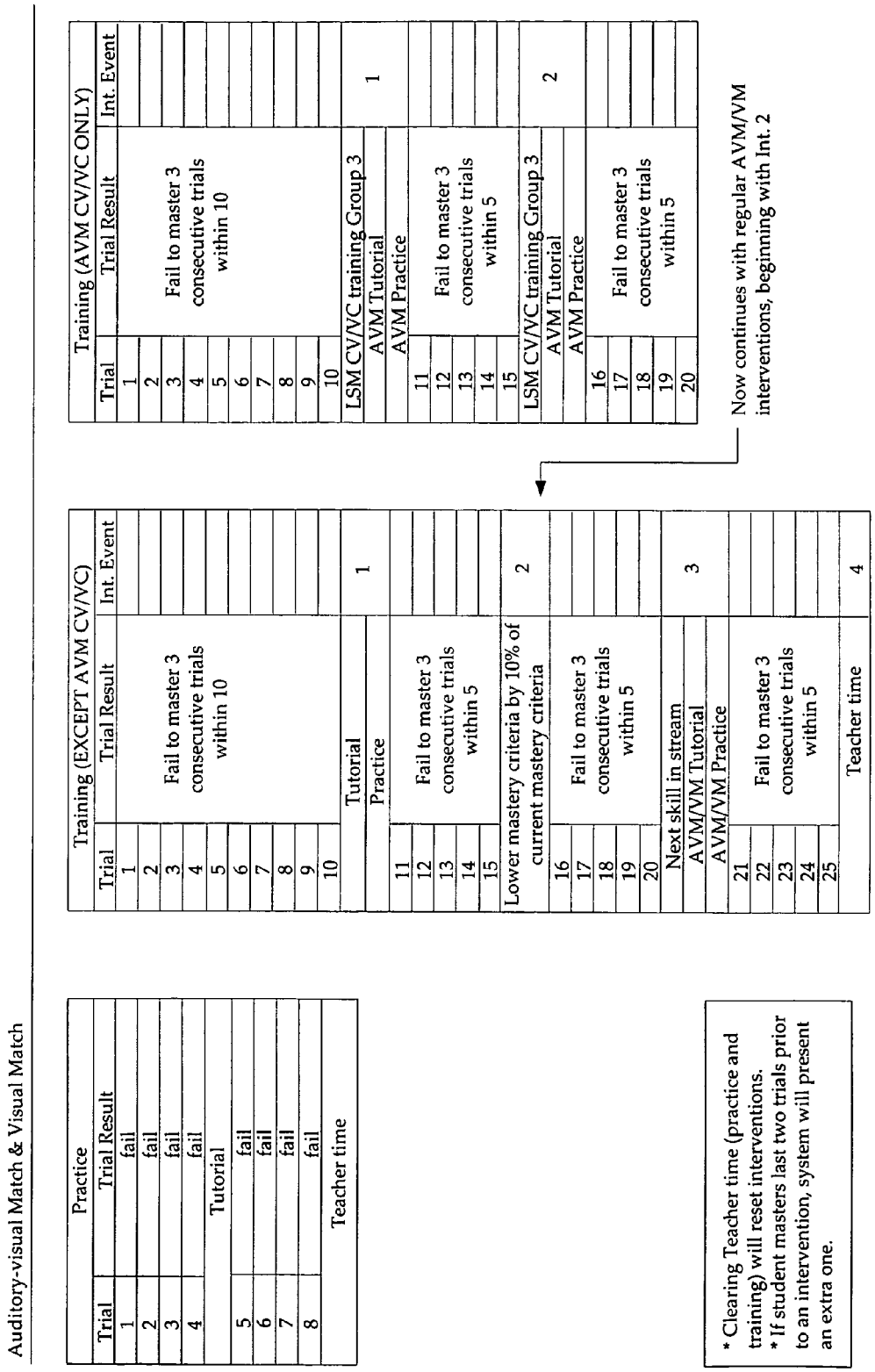
FIG. 4 is an overview of the Intervention summaries for audio-visual matching and visual matching.

FIGS. 4, 5 and 6 represent overviews of the Intervention summaries for auditory-visual match (AVM) and visual match (VM); sound match (SM) and visual match (VM); and comprehension training, respectively.

While particular aspects of the invention have been described and illustrated it will be apparent to one skilled in the art that numerous changes can be made without departing from the basic concepts. It is to be understood, however, that such changes will fall within the full scope of the invention as defined by the appended claims.

We claim:

1. A method of teaching reading skills to a student utilizing a computer based training program on a computer, the computer having components to implement the training program, comprising:

a monitor screen to present instructions, audio component to provide audible instructions, and an interactive component to allow the student to respond to instructions, the method comprising:

conducting, via the computer based training, a comprehensive assessment to determine the student's reading ability, wherein the comprehensive assessment comprises a tutorial stage, a practice stage and a test stage to assign an individualized training program to the student;

said tutorial stage comprising a multi-stepped and graphically engaging set of instructions for explaining both the purpose and mechanics of a task;

said practice stage comprises a criteria for demonstrating understanding of said task;

said test stage comprises assessment materials corresponding to different grade levels;

wherein the individualized training program is designed to be appropriate for the student based upon the student's grade level and level of intervention;

creating the individualized training program based on the comprehensive assessment;

implementing the individualized training program via the computer, the individualized training program comprising a series of training streams including:

a series of phonemic awareness exercises;

a series of reading comprehension exercises;

a series of reading subskill exercises, said subskill exercises including at least a visual matching of a combination of letters having at least one vowel and at least one consonant;

said computer based training program continually monitoring the student's progress whereby intervention in the practice and testing stages is automatically and selectively introduced to improve skill mastery;

said intervention is introduced based on a precondition, wherein said precondition is satisfied when the student fails to satisfy mastery criteria of a particular task after one or more trials;

said intervention comprises at least four or more of the following:

an accelerating component, wherein said accelerating component is initiated to automatically move the student to the next skill level when the student demonstrates mastery in said particular task, a reviewing component, wherein said reviewing component is initiated to review the tutorial and practice stages when the student struggles with said particular task, a modifying component, wherein said modifying component is initiated to modify mastery criteria when the student struggles with said particular task, a recessing component, wherein said recessing component is initiated to present an alternative activity when the student struggles with said particular task, and a notifying component, wherein said notifying component is initiated to notify a teacher when the student demonstrates inability to master a particular skill despite prior interventions; and the computers records the student's performance, wherein said performance comprises percentage correct score, average response time, time spent on task, training starting date and training conclusion date.

2. The method as defined in claim 1 wherein intervention is introduced by accelerating a training activity when the student demonstrates an early mastery in the training activity.

3. The method as defined in claim 1 wherein intervention is introduced by reviewing aspects of the tutorial stage with the student to ensure that the student is aware of the purpose and nature of a training activity.

4. The method as defined in claim 3 wherein the training program is automatically interrupted, and an alternative enjoyable activity is substituted therefore, when a student continues to struggle with a training activity.

5. The method as defined in claim 1 wherein a program administrator is made aware of the student's progress and all intervention activities.

6. The method as defined in claim 5 wherein the training program is put on hold when a student demonstrates an inability to master a training activity.

7. The method as defined in claim 6 wherein the program administrator must intervene in order to re-engage the student's training program.

8. The method as defined in claim 3 wherein the training program re-presents to the student any training activity to which modifications to the mastery criteria occurred.

9. A non-transitory computer program media in machine readable format for use in teaching reading skills to a student, the non-transitory computer program media including instructions for implementation by a computer to:

conduct a comprehensive assessment to determine the student's reading ability, wherein the comprehensive assessment comprises a tutorial stage, a practice stage and a test stage to assign an individualized training program to the student;

said tutorial stage comprising a multi-stepped and graphically engaging set of instructions for explaining both the purpose and mechanics of a task;

said practice stage comprises a criteria for demonstrating understanding of said task;

said test stage comprises assessment materials corresponding to different grade levels;

wherein the individualized training program is designed to be appropriate for the student based upon the student's grade level and level of intervention;

create the individualized training program based on the comprehensive assessment;

implement the individualized training program on the computer, the individualized training program comprising a series of training streams including:

a series of phonemic awareness exercises;

a series of reading comprehension exercises; and a series of reading subskill exercises, said subskill exercises including at least a visual matching of a combination of letters having at least one vowel and at least one consonant;

the individualized training program implemented on the computer continually monitor the student's progress whereby intervention in the practice and testing stages is automatically introduced to improve skill mastery;

said intervention is introduced based on a precondition, wherein said precondition is satisfied when the student fails to satisfy mastery criteria of a particular task after one or more trials;

said intervention comprises at least four or more of the following:

an accelerating component, wherein said accelerating component is initiated to automatically move the student to the next skill level when the student demonstrates mastery in said particular task, a reviewing component, wherein said reviewing component is initiated to review the tutorial and practice stages when the student struggles with said particular task, a modifying component, wherein said modifying component is initiated to modify mastery criteria when the student struggles with said particular task, a recessing component, wherein said recessing component is initiated to present an alternative activity when the student struggles with said particular task, and a notifying component, wherein said notifying component is initiated to notify a teacher when the student demonstrates inability to master a particular skill despite prior interventions; and the computer records the student's performance, wherein said performance comprises percentage correct score, average response time, time spent on task, training starting date and training conclusion date.

10. The non-transitory computer program media as defined in claim 9 capable of selectively introducing intervention instructions.

11. The non-transitory computer program media as defined in claim 10 wherein intervention instructions are introduced by accelerating a training activity when the student demonstrates an early mastery in the training activity.

12. The non-transitory computer program media as defined in claim 10 wherein intervention instructions are introduced by reviewing aspects of the tutorial stage with the student to ensure that the student is aware of the purpose and nature of a training activity.

13. The non-transitory computer program media as defined in claim 12 wherein the training program is automatically interrupted, and an alternative enjoyable activity is substituted therefore, when a student continues to struggle with a training activity.

14. An intervention engine for implementation on a computer using the non-transitory computer program media of claim 9, the intervention engine adapted to monitor the student's progress as the student performs a series of program-based, reading related activities and to introduce modifications to the training program responsive to the student's progress.

15. The intervention engine as defined in claim 14 wherein a training activity is accelerated in response to the student demonstrating an early mastery in the training activity.

16. The intervention engine as defined in claim 14 wherein aspects of the tutorial stage are reviewed with the student, if necessary, to ensure that the student is aware of the purpose and nature of reading related activities.

17. The intervention engine as defined in claim 14 wherein the training program is automatically interrupted, and an alternative enjoyable activity is substituted therefore, if the student continually struggles with one of the reading related activities.

18. The intervention engine as defined in claim 14 wherein the intervention ermine re-presents to the student any training activity to which modifications occurred.

* * * * *

UNITED STATES PATENT AND TRADEMARK OFFICE
CERTIFICATE OF CORRECTION

PATENT NO. : 8,439,684 B2
APPLICATION NO. : 11/511473
DATED : May 14, 2013
INVENTOR(S) : MacGregor et al.

Page 1 of 1

It is certified that error appears in the above-identified patent and that said Letters Patent is hereby corrected as shown below:

In the Claims:

Column 22
Line 25, the word --engine-- should replace the word "ermine"

Signed and Sealed this
Ninth Day of July, 2013

Teresa Stanek Rea
*Acting Director of the United States Patent and Trademark Office*